(12) United States Patent
Horiuchi et al.

(10) Patent No.: US 10,326,843 B2
(45) Date of Patent: Jun. 18, 2019

(54) SYSTEM, APPARATUS, AND METHOD OF MANAGING COMMUNICATION, AND RECORDING MEDIUM

(71) Applicants: Takeshi Horiuchi, Tokyo (JP); Takahiro Asai, Kanagawa (JP)

(72) Inventors: Takeshi Horiuchi, Tokyo (JP); Takahiro Asai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 659 days.

(21) Appl. No.: 14/858,322

(22) Filed: Sep. 18, 2015

(65) Prior Publication Data
US 2017/0078405 A1    Mar. 16, 2017

(30) Foreign Application Priority Data

Sep. 19, 2014  (JP) ................................ 2014-191169
Sep. 14, 2015  (JP) ................................ 2015-180563

(51) Int. Cl.
*H04L 29/06*    (2006.01)
*H04L 29/08*    (2006.01)

(52) U.S. Cl.
CPC .......... *H04L 67/146* (2013.01); *H04L 65/403* (2013.01); *H04L 65/80* (2013.01); *H04L 67/322* (2013.01)

(58) Field of Classification Search
CPC ..... H04L 67/146; H04L 65/403; H04L 65/80; H04L 67/322
See application file for complete search history.

(56) References Cited

U.S. PATENT DOCUMENTS

| | | | | |
|---|---|---|---|---|
| 9,137,187 | B1* | 9/2015 | Goepp | .................... H04L 51/12 |
| 9,332,561 | B1* | 5/2016 | Khawam | ............. H04L 65/1069 |
| 2007/0081459 | A1* | 4/2007 | Segel | .................. H04L 41/0896 370/230 |
| 2011/0219134 | A1* | 9/2011 | Lidstrom | ................ H04L 65/80 709/229 |
| 2013/0100228 | A1* | 4/2013 | Tapia | ............... H04N 21/26216 348/14.01 |
| 2013/0275615 | A1* | 10/2013 | Oyman | ................... H04L 65/60 709/231 |

(Continued)

FOREIGN PATENT DOCUMENTS

| | | |
|---|---|---|
| JP | 2008-227577 | 9/2008 |
| JP | 2009-301193 | 12/2009 |

(Continued)

*Primary Examiner* — Philip J Chea
*Assistant Examiner* — Robert B McAdams
(74) *Attorney, Agent, or Firm* — Oblon, McClelland, Maier & Neustadt, L.L.P.

(57) ABSTRACT

A communication management system stores session identification information for identifying one or more communication sessions for providing the service, and use state information indicating whether each one of the communication sessions is being used. In response to receiving from a first communication terminal a request for starting communication including first service identification information for identifying a first service, the management system transmits to the first communication terminal a session identification information of one of the communication sessions having the use state information indicating that the communication session is not being used based on determination.

15 Claims, 14 Drawing Sheets

(56) References Cited

U.S. PATENT DOCUMENTS

2013/0339529 A1* 12/2013 Rizzo .................... H04L 67/322
                                                             709/226
2014/0244460 A1   8/2014 Imai et al.

FOREIGN PATENT DOCUMENTS

| JP | 2014-048823 | 3/2014 |
| JP | 2014-168123 | 9/2014 |
| JP | 2015-070543 | 4/2015 |
| JP | 2015-130584 | 7/2015 |
| WO | WO2009/091459 A1 | 7/2009 |

* cited by examiner

FIG. 7

| QUALITY ID | SESSION ID |
|---|---|
| q01 | se11 |
| q01 | se12 |
| q02 | se21 |
| q02 | se22 |
| q02 | se23 |
| q03 | se31 |
| q03 | se32 |
| q03 | se33 |
| q03 | se34 |
| ... | ... |

FIG. 8

| QUALITY ID | IMAGE QUALITY PARAMETER | SOUND QUALITY PARAMETER |
|---|---|---|
| q01 | 30 | 44.1 |
| q02 | 20 | 44.1 |
| q03 | 10 | 44.1 |
| q04 | 30 | 22.05 |
| q05 | 20 | 22.05 |
| q06 | 10 | 22.05 |
| ... | ... | ... |

FIG. 9

AUTHENTICATION MANAGEMENT TABLE

| TERMINAL ID | PASSWORD |
|---|---|
| 01aa | aaaa |
| 01ab | abab |
| 01ba | baba |
| ... | ... |

FIG. 10

TERMINAL MANAGEMENT TABLE

| TERMINAL ID | COUNTERPART TERMINAL NAME | OPERATING STATE | DATE/TIME RECEIVED | IP ADDRESS OF TERMINAL |
|---|---|---|---|---|
| 01aa | AA TERMINAL, TOKYO OFFICE, JAPAN | ONLINE (COMMUNICATION OK) | 2014.4.10.13:40 | 1.2.1.3 |
| 01ab | AB TERMINAL, OSAKA OFFICE, JAPAN | OFFLINE | 2014.4.09.12:00 | 1.2.1.4 |
| ... | ... | ... | ... | ... |
| 01ba | BA TERMINAL, BEIJING OFFICE, CHINA | ONLINE (COMMUNICATION OK) | 2014.4.10.13:45 | 1.2.2.3 |
| 01bb | BB TERMINAL, SHANGHAI OFFICE, CHINA | ONLINE (INTERRUPTED) | 2014.4.10.13:50 | 1.2.2.4 |
| ... | ... | ... | ... | ... |
| 01ca | CA TERMINAL, WASHINGTON D.C. OFFICE, U.S. | OFFLINE | 2014.4.10.12:45 | 1.3.1.3 |
| 01cb | CB TERMINAL, NEW YORK OFFICE, U.S. | ONLINE (COMMUNICATING) | 2014.4.10.13:55 | 1.3.1.4 |
| ... | ... | ... | ... | ... |
| 01da | DA TERMINAL, BERLIN OFFICE, EUROPE | ONLINE (COMMUNICATING) | 2014.4.08.12:45 | 1.3.2.3 |
| 01db | DB TERMINAL, LONDON OFFICE, EUROPE | ONLINE (COMMUNICATION OK) | 2014.4.10.12:45 | 1.3.2.4 |
| ... | ... | ... | ... | ... |

FIG. 11

CANDIDATE LIST MANAGEMENT TABLE

| TERMINAL ID OF STARTING TERMINAL | TERMINAL ID OF COUNTERPART TERMINAL |
|---|---|
| 01aa | 01ab, ···, 01ba, 01bb, ···, 01ca, 01cb, 01da, 01db, ··· |
| 01ab | 01aa, 01ca, 01cb |
| 01ba | 01aa, 01ab, 01ca, 01cb, 01da, 01db |
| ... | ... |
| 01db | 01aa, 01ab, 01ba, ···, 01da, 01ca, 01cb, ···, 01da |

FIG. 12

| SERVICE ID | QUALITY ID |
|---|---|
| sv901 | q01 |
| sv902 | q01 |
| sv903 | q01 |
| sv904 | q02 |
| sv905 | q02 |
| sv906 | q02 |
| sv907 | q02 |
| sv908 | q02 |
| ... | ... |

FIG. 13

| QUALITY ID | SESSION ID | USE STATE |
|---|---|---|
| q01 | se11 | 1 |
| q01 | se12 | 0 |
| q02 | se21 | 1 |
| q02 | se22 | 0 |
| q02 | se23 | 0 |
| q03 | se31 | 0 |
| q03 | se32 | 1 |
| q03 | se33 | 0 |
| q03 | se34 | 0 |
| ... | ... | ... |

SYSTEM, APPARATUS, AND METHOD OF MANAGING COMMUNICATION, AND RECORDING MEDIUM

CROSS-REFERENCE TO RELATED APPLICATIONS

This patent application is based on and claims priority pursuant to 35 U.S.C. § 119(a) to Japanese Patent Application Nos. 2014-191169, filed on Sep. 19, 2015, and 2015-180563, filed on Sep. 14, 2015, in the Japan Patent Office, the entire disclosure of which is hereby incorporated by reference herein.

BACKGROUND

Technical Field

The present invention generally relates to managing a plurality of communication terminals that transmit or receive content data.

Description of the Related Art

An example of a communication system that transmits or receives content data between a plurality of communication terminals via a relay device includes a videoconference system that carries out videoconference via a communication network such as the Internet. There is an increasing need for such videoconference systems as the use of such systems contribute to reduction in business trip costs and time. In such a videoconference system, a plurality of videoconference terminals, which are examples of communication terminals, is used. A videoconference can be carried out by transmission or reception of content data such as image data and sound data between these videoconference terminals.

To secure the quality of communication, traffic of content data to be transmitted through one relay device is kept under a certain level depending on processing capability of the relay device, for example, by limiting a number of communication sessions to be managed by one relay device at a time.

SUMMARY

Example embodiments of the present invention include a communication management system, which includes: a memory that stores, for each one of a plurality of services that can be provided to one or more of the plurality of communication terminals, quality information indicating a quality level of the service, session identification information for identifying one or more communication sessions for providing the service, and use state information indicating whether each one of the communication sessions is being used; a receiver that receives, from a first communication terminal of the plurality of communication terminals, a request for starting communication with a second communication terminal, the request including first service identification information for identifying a first service to be provided to the first communication terminal in communicating with the second communication terminal; circuitry that obtains quality information indicating a quality level of the first service, and determines, using information stored in the memory, whether any one of the communication sessions for providing the first service has the use state information indicating that the communication session is not being used; and a transmitter that transmits, to the first communication terminal, a session identification information of one of the communication sessions having the use state information indicating that the communication session is not being used based on determination. The first communication terminal establishes a session identified with the session identification information transmitted from the communication management system, to transmit content data to the second communication terminal through the established session.

Example embodiments of the present invention include a communication system including the communication management system, a method of managing a plurality of communication terminals performed by the communication management system, and a program for causing the communication management system to perform the managing method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 7 is an illustration of an example data structure of a use management table;

FIG. 8 is an illustration of an example data structure of a quality management table;

FIG. 9 is an illustration of an example data structure of an authentication management table;

FIG. 10 is an illustration of an example data structure of a terminal management table;

FIG. 11 is an illustration of an example data structure of a candidate list management table;

FIG. 12 is an illustration of an example data structure of a service management table;

FIG. 13 is an illustration of an example data structure of a use state management table;

Figure 1:
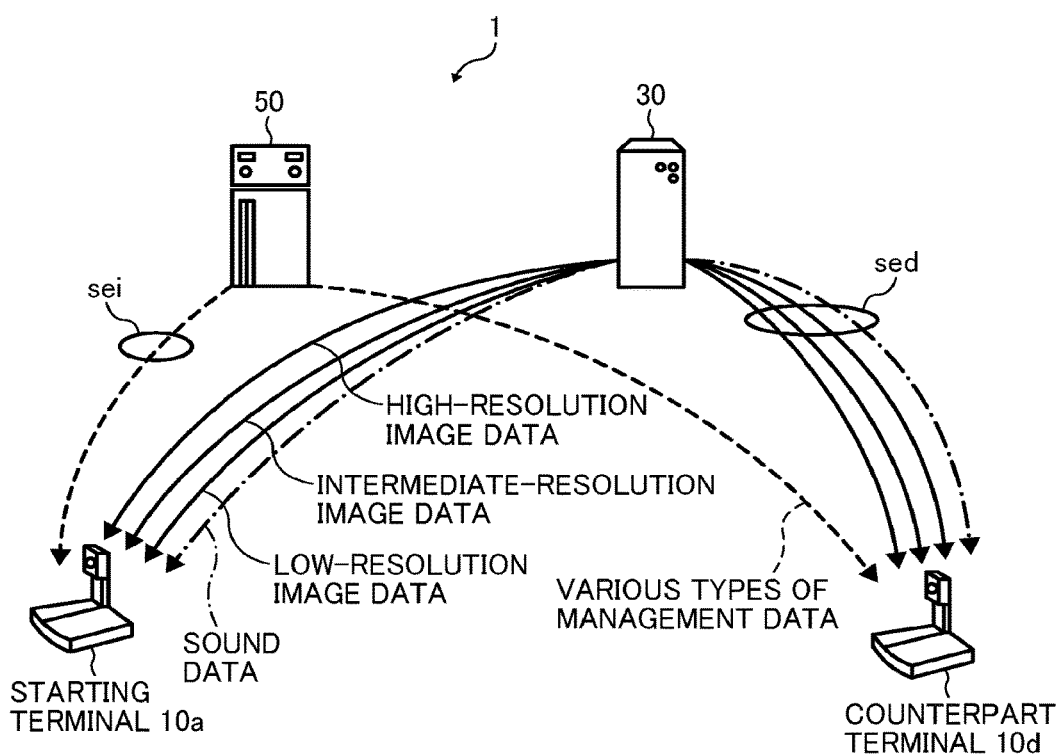
FIG. 1 is a schematic diagram illustrating a part of a communication system relating to videoconference communication, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Referring to the drawings, an embodiment of the present invention is described.

<Configuration of Videoconference System>

Referring to FIG. 1, a communication system 1 for carrying out videoconference among a plurality of communication terminals (10a, 10d) is explained according to the embodiment. FIG. 1 is a schematic diagram illustrating a portion of the communication system 1, which relates to videoconference being carried out between the communication terminals 10a and 10d.

The communication system 1 includes the plurality of communication terminals (10a, 10d), a relay device 30, and a communication management system 50. In the following, any arbitrary one or ones of the plurality of communication terminals (10a, 10d) is or are referred to as the communication terminal 10. The communication terminal 10 transmits or receives image data and sound data as an example of content data. The image data may be a video image or a still image, or both of the video image and the still image.

In this disclosure, the communication terminal that sends a request for starting videoconference is referred to as the "starting terminal", and the communication terminal serving as a request destination (relay destination) of videoconference is referred to as the "counterpart terminal". In FIG. 1, the communication terminal 10a is referred to as the starting terminal, and the communication terminal 10d is referred to as the counterpart terminal. Alternatively, when the communication terminal 10d requests to start videoconference with the communication terminal 10a, the communication terminal 10d is referred to as the starting terminal, and the communication terminal 10a is referred to as the counterpart terminal. Note that the communication terminal 10 may be used not only for communication between different offices or for communication between different rooms in the same office, but also for communication within the same room or for outdoor-indoor communication or outdoor-outdoor communication. In the case where the communication terminal 10 is used outside, wireless communication using a mobile phone communication network or the like is performed.

The relay device 30 relays content data among the plurality of communication terminals 10. The communication management system 50 centrally controls login authentication of the communication terminal 10, management of the communication state of the communication terminal 10, management of a candidate list or the like, and management of the communication state or the like of the relay device 30.

In the communication system 1, a management data session "sei" is established between the starting terminal 10 and the counterpart terminal 10 via the communication management system 50 to transmit or receive various management data therebetween. Between the starting terminal 10 and the counterpart terminal 10, four sessions are established via the relay device 30 to transmit or receive four items of data including high-resolution image data, intermediate-resolution image data, low-resolution image data, and sound data. In FIG. 1, these four sessions are collectively referred to as image and sound data session "sed". The image and sound data session "sed" may not always include four sessions, but any number of sessions greater than or less than four.

Now, resolution of image data to be processed in this embodiment is described. The low-resolution image data serves as a base image and has horizontal 160 pixels by vertical 120 pixels. The intermediate-resolution image data has horizontal 320 pixels by vertical 240 pixels. The high-resolution image data has horizontal 640 pixels by vertical 480 pixels. In the case of a narrow band path, low-quality image data that only includes low-resolution image data serving as a base image is relayed. In the case of a relatively wide band path, intermediate-quality image data including low-resolution image data serving as a base image and intermediate-resolution image data is relayed. In addition, in the case of a very wide band path, high-quality image data including low-resolution image data serving as a base image, intermediate-resolution image data, and high-resolution image data is relayed. Since sound data is relatively small in data size, the sound data is relayed even in the case of a narrow band path.

Examples of the communication system 1 include a data providing system that performs one-way transmission of content data from one communication terminal to another communication terminal via a communication management system, and a communication system that intercommunicates information, information reflecting feelings, or the like between a plurality of communication terminals via a communication management system. The communication system is a system for intercommunicating information, information reflecting feelings, or the like between a plurality of communication terminals via a communication management system, and examples thereof include a teleconference system and a videoconference system.

In this embodiment, the communication system, the communication management system, and the communication terminal will be described while assuming a videoconference system serving as an example of the communication system, a videoconference management system serving as an example of the communication management system, and a videoconference terminal serving as an example of the communication terminal. That is, the communication terminal and the communication management system according to the embodiment of the present invention are applied not only to a videoconference system, but also to any desired communication system.

<Hardware Configuration of Communication System>

Figure 2:
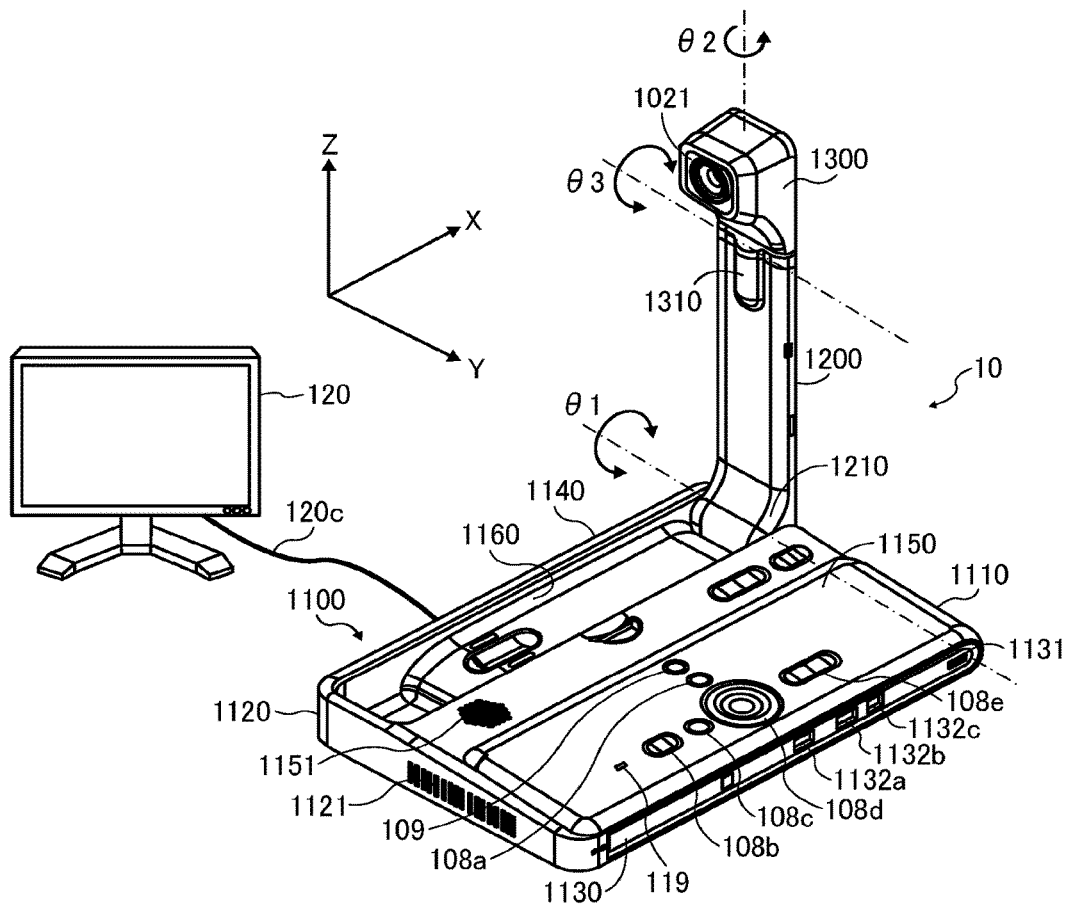
FIG. 2 is a perspective view illustrating an outer appearance of a communication terminal of the communication system of FIG. 1.

Now, a hardware configuration of the communication system 1 is described. FIG. 2 is a perspective view illustrating an outer appearance of the communication terminal 10 of the communication system 1 of FIG. 1. As illustrated in FIG. 2, the communication terminal 10 includes a casing 1100, an arm 1200, and a camera housing 1300. The casing 1100 has a front wall 1110 provided with an inlet face including a plurality of inlet holes, and a back wall 1120 having an exhaust face 1121 on which a plurality of exhaust holes is formed. As a cooling fan included in the casing 1100 is driven, air behind the communication terminal 10 can be taken in via the inlet face and exhausted to the rear of the communication terminal 10 via the exhaust face 1121. A right-side wall 1130 of the casing 1100 has a sound pickup hole 1131 formed thereon, and a built-in microphone 114, described later, is capable of picking up sound such as sound, noise, or vibration.

An operation panel 1150 is formed toward the right-side wall 1130 of the casing 1100. The operation panel 1150 has a plurality of operation keys (108a to 108e) described later, a power switch 109 described later, and an alarm lamp 119 described later, which are formed thereon. The operation panel 1150 further has a sound output face 1151 formed thereon, which is formed of a plurality of sound output holes for allowing output sound from a built-in speaker 115 described later to pass through. In addition, an accommodation portion 1160 serving as a recess for accommodating the arm 1200 and the camera housing 1300 is formed toward a left-side wall 1140 of the casing 1100. A plurality of connection ports (1132a to 1132c) for electrically connecting cables to an external device connection interface (I/F) 118 described later is provided on the right-side wall 1130 of the casing 1100. In contrast, a connection port for electrically connecting a cable 120c for a display 120 to the external device connection I/F 118 described later is provided toward the left-side wall 1140 of the casing 1100.

The following description uses the term "operation key(s) 108" for indicating an arbitrary one or ones of the operation keys (108a to 108e), and the term "connection port(s) 1132" for indicating an arbitrary one or ones of the connection ports (1132a to 1132c).

The arm 1200 is attached to the casing 1100 via a torque hinge 1210 so as to be rotatable in the vertical direction within the range of a tilt angle θ1 of 135 degrees with respect to the casing 1100. FIG. 2 illustrates a state in which the tilt angle θ1 is 90 degrees. The camera housing 1300 has a built-in camera 112 provided thereon, which will be described later, and the camera 112 can capture an image of a user, a document, a room, or the like. The camera housing 1300 is formed with a torque hinge 1310. With the torque hinge, the camera housing 1300 is attached to the arm 1200. The camera housing 1300 is made rotatable in the vertical and horizontal directions within the range of a pan angle θ2 of ±180 degrees and a tilt angle θ3 of +45 degrees with respect to the arm 1200, in which the state illustrated in FIG. 2 serves as 0 degrees.

Note that the external view illustrated in FIG. 2 is only exemplary and the appearance is not restricted thereto. The camera 112 and the microphone 114 need not necessarily be built-in devices and may be external devices. Since the transmission management system 50 has the same appearance as that of a general server computer, a description of the appearance thereof is omitted.

Figure 3:
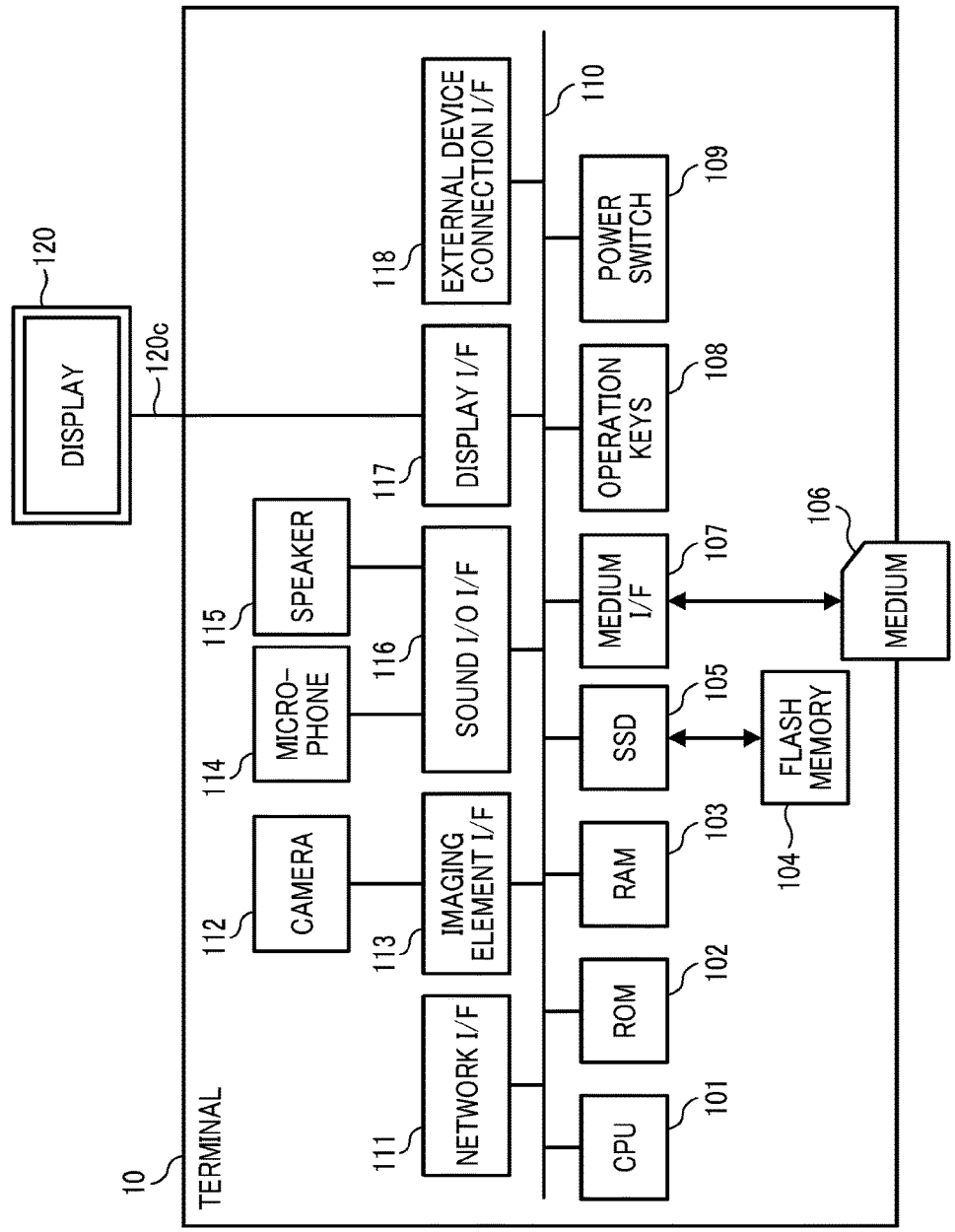
FIG. 3 is a schematic block diagram illustrating a hardware configuration of the communication terminal of FIG. 2.

FIG. 3 is a schematic block diagram illustrating a hardware configuration of the communication terminal 10. As illustrated in FIG. 3, the communication terminal 10 of the embodiment includes a central processing unit (CPU) 101 that controls entire operation of the communication terminal 10, a read only memory (ROM) 102 that stores a program for operating the CPU 101 such as an initial program loader (IPL), a random access memory (RAM) 103 that operates as a work area for the CPU 101, a flash memory 104 that stores various types of data, such as the terminal control program, image data, and sound data, a solid state drive (SSD) 105 that controls reading/writing of various types of data from/to the flash memory 104 under control of the CPU 101, a medium I/F 107 that controls reading/writing (storage) of data from/to a recording medium 106, the operation key 108 operated in the case of, for example, selecting a counterpart terminal of the communication terminal 10, the power switch 109 for turning on/off the power of the communication terminal 10, and a network interface (I/F) 111 for transmitting data using the communication network 2. In alternative to the SSD, a hard disk drive (HDD) may be used.

In addition, the communication terminal 10 includes the built-in camera 112, which captures an image of a subject and obtains image data under control of the CPU 101, an imaging element I/F 113 that controls driving of the camera 112, the built-in microphone 114, which receives a sound input, the built-in speaker 115, which outputs sounds, a sound input/output I/F 116 that processes inputting/outputting of a sound signal between the microphone 114 and the speaker 115 under control of the CPU 101, a display I/F 117 that transmits image data to an external display 120 under control of the CPU 101, the external device connection I/F 118 for connecting various external devices, and a bus line 110 such as an address bus and a data bus for electrically connecting the above-described elements as illustrated in FIG. 3.

The display 120 is a display formed of liquid crystal or organic electroluminescence (EL) that displays an image of a subject, an operation icon, or the like. In addition, the display 120 is connected to the display I/F 117 by the cable 120c. The cable 120c may be an analog red green blue (RGB) (video graphic array (VGA)) signal cable, a component video cable, a high-definition multimedia interface (HDMI) signal cable, or a digital video interactive (DVI) signal cable.

The camera 112 includes a lens and a solid-state imaging element that converts an image (video) of a subject to electronic data by converting light to electric charge. As the solid-state imaging element, for example, a complementary metal-oxide-semiconductor (CMOS) or a charge-coupled device (CCD) is used.

The external device connection I/F 118 is capable of connecting an external device such as an external camera, an external microphone, or an external speaker by using a Universal Serial Bus (USB) cable or the like. In the case where an external camera is connected, the external camera is driven in preference to the built-in camera 112 under control of the CPU 101. Similarly, in the case where an external microphone is connected or an external speaker is connected, the external microphone or the external speaker is driven in preference to the built-in microphone 114 or the built-in speaker 115 under control of the CPU 101.

The recording medium 106 is removable from the communication terminal 10. In addition, a non-volatile memory that reads or writes data under control of the CPU 101 is not limited to the flash memory 104, and an electrically erasable and programmable read-only memory (EEPROM) may be used instead. Further, the terminal control program may be recorded in a file in a format installable or executable on a computer-readable recording medium such as the recording medium 106 for distribution In addition, the terminal control program may be stored on the ROM 102, instead of the flash memory 104.

Figure 4:
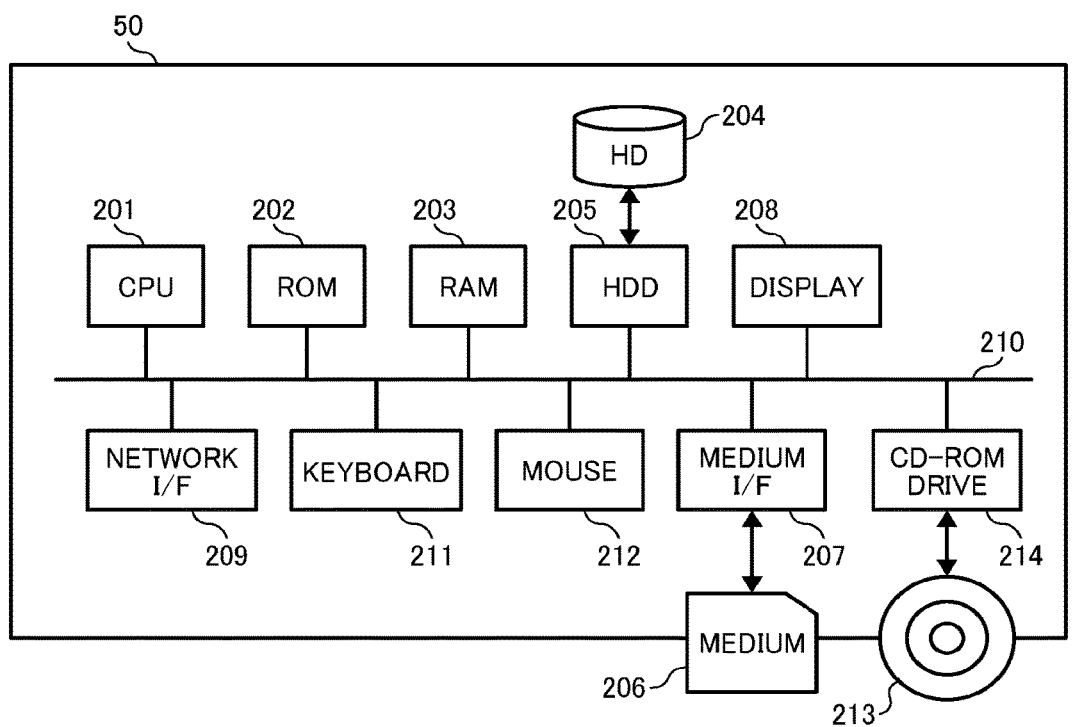
FIG. 4 is a schematic block diagram illustrating a hardware configuration of a communication management system of the communication system of FIG. 1.
Figure 6:
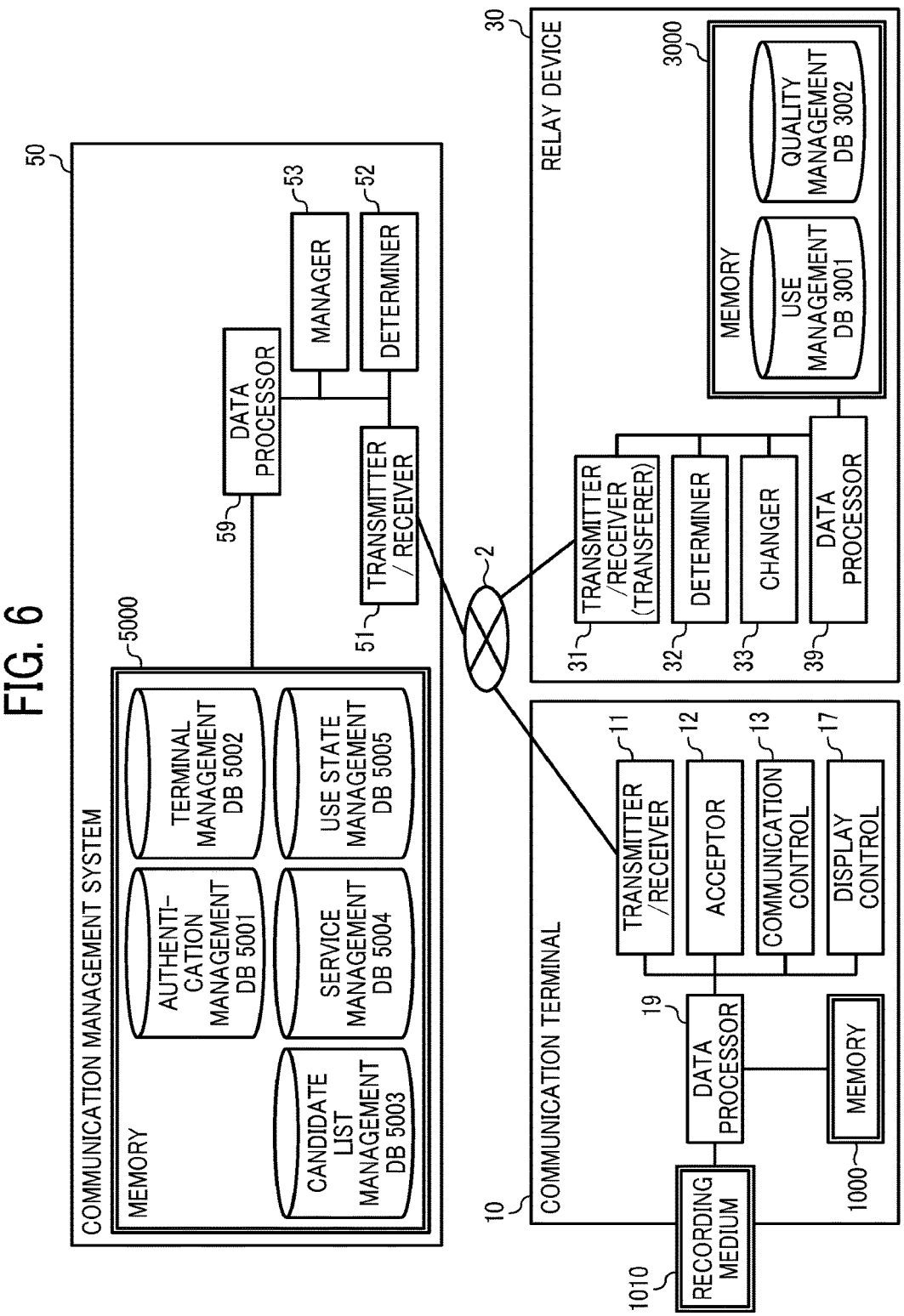
FIG. 6 is a schematic block diagram illustrating a functional configuration of the communication system of FIG. 1 according to an embodiment of the present invention.

FIG. 4 is a diagram illustrating a hardware configuration of the communication management system 50 according to the embodiment. The communication management system 50 includes a CPU 201 that controls entire operation of the communication management system 50, a ROM 202 that stores a program for operating the CPU 201, such as an IPL, a RAM 203 used as a work area for the CPU 201, the HD 204, which stores various types of data, such as the communication management program, a hard disk drive (HDD) 205 that controls reading/writing of various types of data from/to the HD 204 under control of the CPU 201, a medium I/F 207 that controls reading/writing (storage) of data from/to a recording medium 206 such as a flash memory, a display 208 that displays various types of information such as a cursor, a menu, a window, characters, or an image, a network I/F 209 for transmitting data using the communication network 2, a keyboard 211 including a plurality of keys for entering characters, numerals, and various instructions, a mouse 212 that selects and executes various instructions, selects a processing target, and moves the cursor, a compact disc read-only memory (CD-ROM) drive 214 that controls reading/writing of various types of data from/to a CD-ROM 213 serving as an example of a removable recording medium, and a bus line 210 such as an address bus and a data bus for electrically connecting the above-described elements, as illustrated in FIG. 6.

Note that the communication management program may be recorded in a file in a format installable or executable on a computer-readable recording medium such as the recording medium 206 or the CD-ROM 213 for distribution. In addition, the communication management program may be stored on the ROM 202, instead of the HD 204.

Other examples of the removable recording medium include a computer-readable recording medium such as a compact disc recordable (CD-R), a digital versatile disk (DVD), and a Blue-ray disk.

Since the relay device 30 has a hardware configuration that is the same as or similar to that of the above-described communication management system 50, descriptions thereof are omitted. In case of the relay device 30, the HD 204 stores a relay device control program in alternative to the communication management program.

<Configuration of Communication System>

Figure 5:
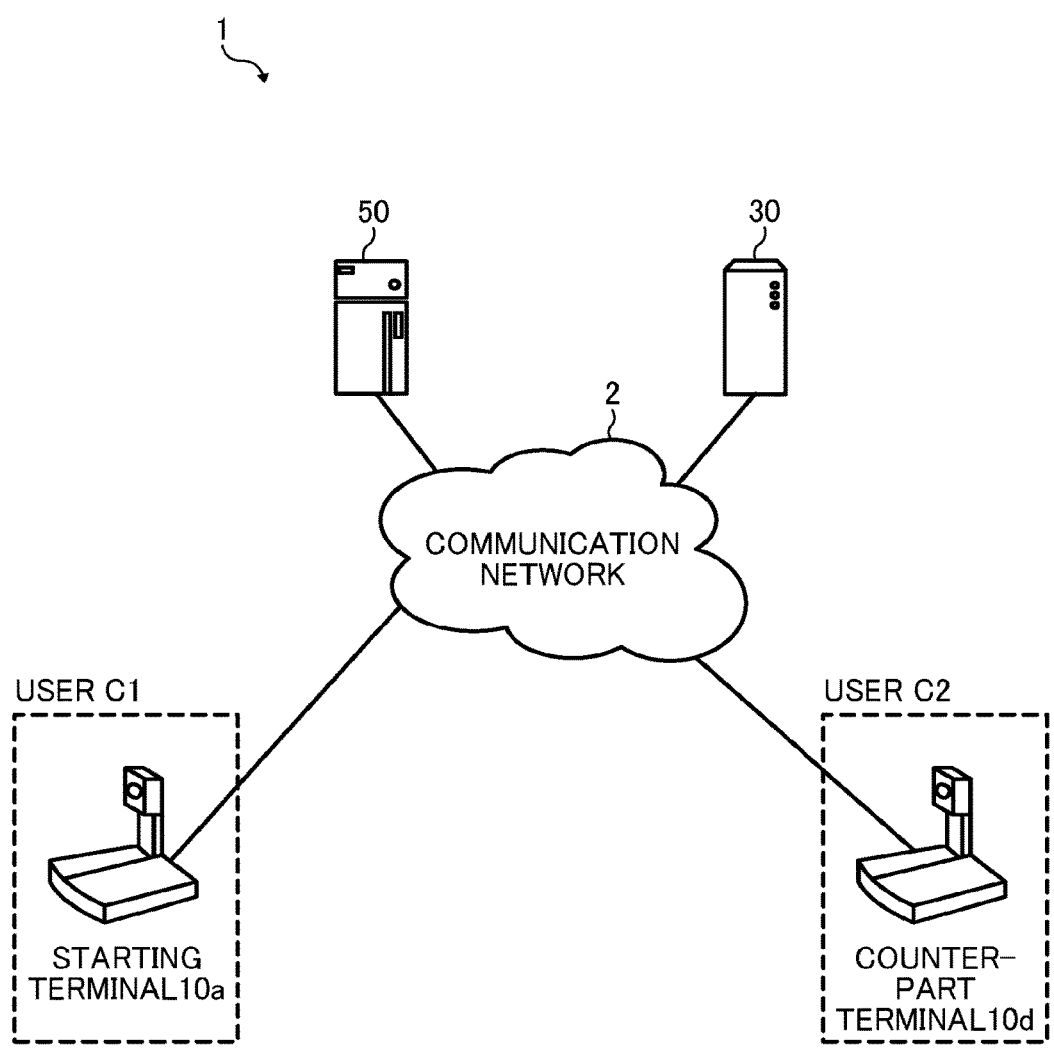
FIG. 5 is a schematic diagram illustrating the communication system of FIG. 1.

Referring now to FIG. 5, a configuration of the communication system 1 is explained according to the embodiment. FIG. 5 is a schematic diagram illustrating the communication system 1 of FIG. 1.

In FIG. 5, the starting terminal 10a, the counterpart terminal 10d, the relay device 30, and the communication management system 50 are connected to the communication network 2 including the Internet. The communication network 2 may include wireless network, in addition to wired network. The communication terminal 10a is operated by a user C1, and the communication terminal 10d is operated by a user C2. The communication management system 50 provides the communication terminal 10 with various services as described below.

<Functional Configuration of Communication System>

Referring now to FIGS. 3, 4, and 6, a functional configuration of the communication system 1 of FIG. 1 is described according to an embodiment of the present invention. FIG. 6 is a schematic block diagram illustrating a functional configuration of the communication system 1 of FIG. 1 according to the embodiment of the present invention. In FIG. 6, the communication terminal 10, the relay device 30, and the communication management system 50 are connected with one another to transmit or receive data via the communication network 2. In the following, for simplicity, the communication terminal 10 may simply be referred to as the terminal 10, and the communication management system 50 may simply be referred to as the management system 50. Further, in the following, it is assumed that a plurality of terminals 10aa, 10ab, . . . , 10ba, 10bb, . . . , 10ca, 10cb, . . . , 10da, 10db . . . is provided in the communication system 1 of FIG. 1.

<Functional Configuration of Terminal>

The terminal 10 includes a transmitter/receiver 11, an acceptor 12, a communication control 13, a display control 17, and a data processor 19. These units are functions that are implemented by operating any of the elements illustrated in FIG. 3 in cooperation with the instructions of the CPU 101 according to the terminal control program expanded from the flash memory 104 to the RAM 103. The terminal 10 further includes a memory 1000 configured by the RAM 103 illustrated in FIG. 3 and the flash memory 104 illustrated in FIG. 3. The terminal 10 is inserted with a recording medium 1010, which is implemented by the recording medium 106 illustrated in FIG. 3. The data processor 19 reads or writes various data from or to the recording medium 1010.

Referring to FIGS. 3 and 6, a functional configuration of the terminal 10 is explained in detail. In the following description of functional configuration of the terminal 10, relationships of the elements in FIG. 3 with the functional configuration of the terminal 10 in FIG. 6 will also be described.

The transmitter/receiver 11 of the terminal 10 illustrated in FIG. 6, which may be implemented by the instructions of the CPU 101 of FIG. 3, and the network I/F 111 of FIG. 3, transmits or receives various data (or information) to the other terminal, device, or system through the communication network 2. Before starting communication with a desired counterpart terminal, the transmitter/receiver 11 starts receiving state information indicating the state of each candidate counterpart terminal, from the management system 50. The state information not only indicates the operating state of each terminal 10 (whether the terminal 10 is online or offline), but also indicates a detailed state such as whether the terminal 10 whose state is online is now capable of communicating or is currently communicating, or the user of the terminal 10 is not at the terminal 10. In addition, the state information not only indicates the operating state of each terminal 10, but also indicates various states, such as the state that the cable 120c is disconnected from the terminal 10, the state that the terminal 10 can output sounds but not images, or the state that the terminal 10 is muted. Hereinafter, the case in which the state information indicates the operating state will be described by way of example.

The acceptor 12, which is implemented by the instructions of the CPU 101 illustrated in FIG. 3, accepts various inputs from the user through the operation keys 108 and the power switch 109 illustrated in FIG. 3. For example, when the user turns on the power switch 109 illustrated in FIG. 3, the acceptor 12 illustrated in FIG. 6 accepts the power on operation and turns on the power.

The communication control 13 is implemented by the instructions of the CPU 101, and any desired device relating to input or output of content data. In one example, the communication control 13 is implemented by the instructions of the CPU 101 illustrated in FIG. 3 and by the camera 112 and the imaging element I/F 113 illustrated in FIG. 3. The communication control 13 captures an image of a subject and outputs image data obtained by capturing the image.

In another example, the communication control 13 is implemented by the instructions of the CPU 101 illustrated in FIG. 3 and by the sound input/output I/F 116 illustrated in FIG. 3. After the sound of the user is converted to a sound signal by the microphone 114, the communication control 13 receives sound data according to this sound signal. The communication control 13 further outputs the sound signal according to the sound data to the speaker 115, and the speaker 115 outputs sound.

The display control 17 is implemented by the instructions of the CPU 101 illustrated in FIG. 3 and by the display I/F 117 illustrated in FIG. 3. The display control 17 combines images of different resolutions and transmits the combined image to the display 120. The display control 17 also transmits information on a candidate list, received from the management system 50, to the display 120, and controls display of the candidate list on the display 120.

The data processor 19, which is implemented by the instructions of the CPU 101 illustrated in FIG. 3 and by the SSD 105 illustrated in FIG. 3, or by the instructions of the CPU 101, performs processing to store various types of data in the memory 1000 or the recording medium 1010 or to read various types of data stored in the memory 1000 or the recording medium 1010. The memory 1000 stores a terminal identification (ID) for identifying the terminal 10, a password, and the like. Alternatively, at least one of the terminal ID and the password may be recorded on the recording medium 1010 and may be read out by the data processor 19 from the recording medium 1010.

In this embodiment, the recording medium 1010 is stored with a service ID, which identifies a service (such as a communication service) that can be provided by a service provider to the user at the terminal 10. The service ID may differ, for example, a type of service such as a videoconference service, a remote monitoring service, etc. Moreover, a usage fee for using the service may differ depending on the type of service, as communication quality (specific content of service) differs depending on the type of service. For this reasons, the service ID for identifying the service, which may be used for identifying the service type, may further be used to specify a communication quality, such as quality of content data to be communicated, or a usage fee to be charged to the user in using such service.

The user at the communication terminal 10 can have a right to receive the service from the service provider, who may be an administrator at the communication management system 50, for example, through having an agreement with the service provider. In this embodiment, the user, who is allowed to have that right, may be any entity such as an individual user or an organization such as a company. The service provider may store a specific service ID of the service to be provided to the user, and stores such service ID in the recording medium 1010. The recording medium 1010 may be implemented by an Integrated Circuit (IC) card, such as a subscriber identity module (SIM) card. The user, who buys a right to have such service, may insert the recording medium 1010, such as the SIM card, to the terminal 10 to be operated by the user. Alternatively, the user may buy the recording medium 1010 storing a specific service ID, to have a right to receive the service identified by the service ID from the service provider, and inserts the recording medium 1010 to the terminal 10.

The terminal 10, which reads out the service ID stored in the recording medium 1010, transmits the read service ID to the management system 50. Based on the service ID, the management system 50 is able to provide the service as specified by the service ID.

Further, every time image data and sound data are received in performing communication with a counterpart terminal, the memory 1000 overwrites the image data and sound data. The display 120 displays an image based on image data before being overwritten, and the speaker 115 outputs sound based on sound data before being overwritten.

Note that a terminal ID in the embodiment is an example of identification information that is used to uniquely identify a specific terminal 10, such that a language, a character(s), a symbol(s), or various marks are not limited to the above-described embodiment. For example, a combination of at least two of the above-mentioned language, character(s), symbol(s), and various marks may be used as a terminal ID. Instead of a terminal ID, a user ID for identifying the user at the terminal 10 may be used. In such case, terminal identification information includes not only the terminal ID, but also the user ID.

<Functional Configuration of Relay Device>

The relay device 30 includes a transmitter/receiver 31, a determiner 32, a changer 33, and a data processor 39. These units are functions that are implemented by or that are caused to function by operating any of the elements illustrated in FIG. 4 in cooperation with the instructions of the CPU 201 according to the relay device control program expanded from the HD 204 to the RAM 203. The relay device 30 also includes a memory 3000 implemented by the RAM 203 illustrated in FIG. 4 and/or the HD 204 illustrated in FIG. 4.

(Use Management Table)

FIG. 7 is an illustration of an example data structure of a use management table. The memory 3000 of the relay device 30 stores a use management DB 3001 such as the use management table illustrated in FIG. 7. The use management table of FIG. 7 stores a quality ID for identifying a type of the communication quality of the service that the management system 50 can provide to the terminal 10, in association with a session ID for identifying a communication session that can be used for communication having that communication quality with the specific quality ID. For example, referring to FIG. 7, a session with the session ID "sel1" and a session with the session ID "sel2" can be used for communication having the communication quality identified with the quality ID "q01".

(Quality Management Table)

FIG. 8 is an illustration of an example data structure of a quality management table. The memory 3000 further stores a quality management DB 3002 configured by the quality management table illustrated in FIG. 8. The quality management table of FIG. 8 stores, for each quality ID of the communication quality, information regarding the communication quality in providing the service having such communication quality, specifically, the image quality parameter of the image and the sound quality parameter of the sound. The image quality parameter is, for example, a frame rate of the image to be transmitted. The sound quality parameter is, for example, a sampling rate of the sound to be transmitted.

(Functional Configuration of Relay Device)

Referring to FIGS. 4 to 6, a functional configuration of the relay device 30 will be described in detail. In the following description of functional configuration of the relay device 30, relationships of the elements in FIG. 4 with the functional configuration of the relay device 30 in FIG. 6 will also be described.

The transmitter/receiver 31 of the relay device 30 illustrated in FIG. 6, which is implemented by the instructions of the CPU 201 illustrated in FIG. 4 and by the network I/F 209 illustrated in FIG. 4, transmits or receives various types of data (or information) to or from another terminal, device, or system via the communication network 2. The transmitter/receiver 31 also serves as a transferer, which transfers image data and sound data transmitted from one terminal 10 to the counterpart terminal 10.

The determiner 32, which may be implemented by the instructions of the CPU 201, determines whether quality of image data and sound data transmitted from the terminal 10 matches the image quality parameter of the communication quality.

The changer 33, which may be implemented by the instructions of the CPU 201, changes, if needed, the quality parameter of the image data and the sound data, transmitted from the terminal, before transferring such image data and sound data to the counterpart terminal, according to contents of the quality management table (FIG. 8).

The data processor 39, which may be implemented by the instructions of the CPU 201 illustrated in FIG. 6 and the HDD 205 illustrated in FIG. 6, performs processing to store various types of data in the memory 3000 or read various types of data stored in the memory 3000.

<Functional Configuration of Management System>

The management system 50 includes a transmitter/receiver 51, a determiner 52, a manager 53, and a data processor 59. These units are functions that are implemented by or that are caused to function by operating any of the elements illustrated in FIG. 4 in cooperation with the instructions of the CPU 201 according to the communication management program expanded from the HD 204 to the RAM 203. In addition, the management system 50 includes a memory 5000 configured by the HD 204 illustrated in FIG. 4.

(Authentication Management Table)

FIG. 9 is an illustration of an example data structure of an authentication management table. The memory 5000 stores an authentication management DB 5001 configured by the authentication management table illustrated in FIG. 9. In the authentication management table, for each one of the terminals 10 managed by the management system 50, the terminal ID and the password are stored in association with each other. For example, the authentication management table illustrated in FIG. 9 indicates that the terminal ID of the terminal 10aa is "01aa", and the password of the terminal 10aa is "aaaa".

(Terminal Management Table)

FIG. 10 is an illustration of an example data structure of a terminal management table. The memory 5000 stores a terminal management DB 5003 such as the terminal management table illustrated in FIG. 10. The terminal management table stores, for each one of the terminals 10 managed by the management system 50, the terminal ID of the terminal 10, a counterpart terminal name in the case where the terminal 10 serves as a counterpart terminal, the operating state of the terminal 10, a date/time received at which login request information described later is received at the management system 50, and the IP address of the terminal 10, in association with one another. For example, the terminal management table illustrated in FIG. 10 indicates that the terminal 10aa with the terminal ID "01aa" has the counterpart terminal name "AA terminal, Tokyo office, Japan", the operating state "online (communication OK)", the date/time received at which login request information is received by the management system 50 "Apr. 10, 2014, 13:40", and the IP address "1.2.1.3".

(Candidate List Management Table)

FIG. 11 is an illustration of an example data structure of a candidate list management table. The memory 5000 further stores a candidate list management DB 5004 configured by the candidate list management table illustrated in FIG. 11. The candidate list management table stores, for each one of the terminals 10 managed by the management system 50, the terminal ID of the terminal 10 (starting terminal) that requests to start communication, in association with the terminal IDs of all counterpart terminals 10 registered as candidate counterpart terminals for the starting terminal 10. For example, the candidate list management table illustrated in FIG. 11 indicates that candidates for a counterpart terminal to which a starting terminal (terminal 10aa) whose terminal ID is "01aa" can send a request to start communication in a videoconference are the terminal 10ab whose terminal ID is "01ab", the terminal 10ba whose terminal ID is "01ba", the terminal 10bb whose terminal ID is "01bb", and so forth. The candidate counterpart terminals are updated by addition or deletion in response to an addition or deletion request received from an arbitrary starting terminal to the management system 50.

(Service Management Table)

FIG. 12 is an illustration of an example data structure of a service management table. The memory 5000 further stores a service management DB 5007 configured by the service management table illustrated in FIG. 12. The service management table of FIG. 12 stores, for each service of the services that can be provided by the management system 50, a service ID for identifying the service in association with a quality ID of the communication quality of that service. For example, the service management table of FIG. 12 indicates that, for the service with the service ID "sv901", the service with the communication quality identified by the quality ID "q01" is provided.

For example, in the service management table, the service ID for identifying the videoconference service is stored in association with the quality ID for identifying information indicating parameters of communication quality of content data (image data and/or sound data) to be used for providing the videoconference service.

(Use State Management Table)

FIG. 13 is an illustration of an example data structure of a use state management table. The memory 5000 further stores the use state management DB 3001 configured by the use state management table illustrated in FIG. 13. The use state management table of FIG. 13 stores the quality ID of the communication quality of the service as managed by the service management table of FIG. 12, the session ID of the session for providing communication with the communication quality identified with the quality ID, and use state information indicating whether that communication session is being used, in association with one another. For example, referring to FIG. 13, the value "1" of the use state information ("use state value") indicates that the communication session is used, and the use state value "0" indicates that the communication session is not used.

In this embodiment, the relationship between the quality ID and the session ID of the use state management table of FIG. 13 is the same as the relationship between the quality ID and the session ID of the use management table of FIG. 7. In FIGS. 7 and 13, the quality ID "q01" is associated with the session IDs "sel1" and "sel2" of two different sessions. For example, the management system 50 transmits association information indicating association between the quality ID and the session ID, and/or information regarding the image quality parameters for the quality ID, to each one of the relay devices 30. Based on the information received from the management system 50, the relay device 30 generates or updates as needed the tables of FIG. 7 and FIG. 8.

In the service management table of FIG. 12, the quality ID "q01" is associated with the service IDs "sv901" "sv902" and "sv903" of three different services. That is, a number of service IDs that are issued for the service having the same communication quality is made greater than a number of communication sessions that are available for communication having the same communication quality at a specific point in time. For example, when three service IDs "sv901", "sv902", and "sv903" are issued, the communication sessions that can be used for communication with the communication quality defined by the quality ID of those service IDs are limited to two (less than the number of service IDs being issued). The terminal 10 that has requested to start communication can receive the service (such as the service of relaying content data for communication) with the quality ID "q01" in order that the management system 50 receives such request. The terminal 10, which cannot receive the service at that time as the communication sessions are all used, will wait until the communication session becomes available as the other terminal 10 ends the communication session.

As described above, for the communication quality with the quality ID "q01", the number of communication sessions that can be used at a specific point in time is two (the number of session IDs is two) as illustrated in FIG. 13, but the number of service IDs that can be issued is three as illustrated in FIG. 12. Accordingly, one service ID is always left at the time, such that a surplus number of service IDs with respect to the number of communication sessions is one.

For the communication quality with the quality ID "q02", which is less quality than that of the quality ID "q01", this relationship between the number of communication session IDs and the number of session IDs at a point in time differ. More specifically, for the quality ID "q02", the number of communication sessions that can be used at a specific point in time is three (the number of session IDs is three) as illustrated in FIG. 13, but the number of service IDs that can be issued is five as illustrated in FIG. 12. Accordingly, two service IDs are always left at the time, such that a surplus number of service IDs with respect to the number of communication sessions is two.

As described above, the number of communication sessions that are available at a specific point in time is determined, depending on the level of communication quality to be provided, which can be defined by the service ID (or the quality ID associated with the service ID). For example, for the service ID identifying the service with higher communication quality that is provided at a higher usage fee, a surplus number of service IDs is made smaller with respect to the number of communication sessions available at a specific point in time. For the service ID identifying the service with lower communication quality that is provided at a lower usage fee, a surplus number of service IDs is made greater with respect to the number of communication sessions available at a specific point in time.

<Operation>

Referring to FIGS. 14 to 18, operation performed by the communication system 1 is explained according to an embodiment of the present invention.

For the descriptive purposes, it is assumed that candidates of counterpart terminals for the starting terminal 10, which are registered in the candidate list management table of FIG. 11, are the terminals 10ab, 10ba, and 10db.

Figure 14:
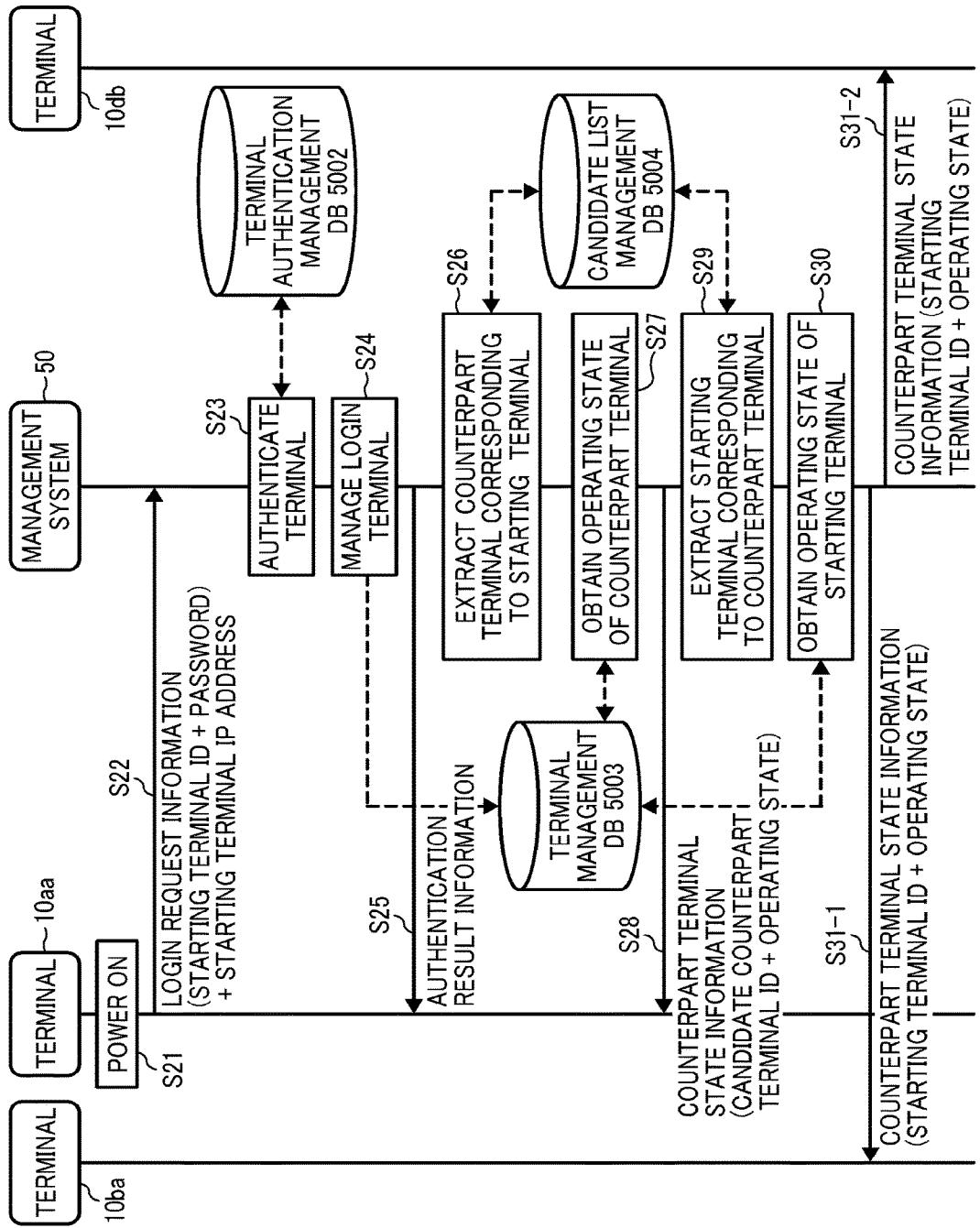
FIG. 14 is a data sequence diagram illustrating operation of processing a login request from the communication terminal, performed by the management system of FIG. 1, according to an embodiment of the present invention.

Referring to FIG. 14, operation of processing a login request from the terminal 10aa is explained. FIG. 14 is a data sequence diagram illustrating operation of processing the login request from the terminal 10aa, according to an embodiment of the present invention. In FIG. 14, various management data is transmitted or received through the management data session "sei" in FIG. 1.

When the user of the starting terminal (terminal 10aa) turns on the power switch 109 illustrated in FIG. 2, the acceptor 12 illustrated in FIG. 6 accepts the power on operation and turns on the power (S21). In response to acceptance of the power on operation, the transmitter/receiver 11 automatically transmits login request information indicating a login request to the management system 50 via the communication network 2 (S22). Note that the login request information may be transmitted in response to operation of the operation keys 108 by the user, instead of turning on of the power switch 109. The login request information includes a terminal ID for identifying the terminal 10aa, which is a local terminal serving as a starting terminal, and a password. The terminal ID and the password are data that have been read via the data processor 19 from the memory 1000 and sent to the data transmitter/receiver 11. Alternatively, the terminal ID and the password may be recorded on the recording medium 1010 and may be read out from the recording medium 1010. In the case of transmitting login request information from the terminal 10aa to the management system 50, the management system 50 receives the IP address of the terminal 10aa, which is a transmitting side.

Next, the data processor 59 of the management system 50 performs terminal authentication by searching the authentication management table of FIG. 9 using the terminal ID and the password included in the login request information received via the data transmitter/receiver 51 as search keys, and determining whether the same terminal ID and the same password are managed in the authentication management table of FIG. 9 (S23). In the case where the data processor 59 determines that the login request is a login request received from a terminal 10 that has a legitimate use authority since the same terminal ID and the same password are managed, the data processor 59 stores, in the terminal management table of FIG. 10, the terminal ID of the terminal 10*aa*, the operating state, the date/time received at which the above-described login request information is received, and the IP address of the terminal 10*aa* in association with one another (S24). Accordingly, the operating state "Online (Communication OK)", the date/time received "4.10.2014.13:40", and the IP address "1.2.1.3" of the terminal 10*aa* are managed in association with the terminal ID "01*aa*" in the terminal management table illustrated in FIG. 10.

The data transmitter/receiver 51 of the management system 50 transmits authentication result information indicating an authentication result to the starting terminal (terminal 10*aa*) which has sent the login request, via the communication network 2 (S25). In the embodiment, the case in which it has been determined that the terminal 10*aa* is a terminal that has a legitimate use authority will be described as follows.

The data processor 59 of the management system 50 searches the candidate list management table of FIG. 11 using the terminal ID "01*aa*" of the starting terminal 10*aa* which has sent the login request as a search key, and reads out to extract the terminal ID of a candidate counterpart terminal that can communicate with the starting terminal 10*aa* (S26). For the descriptive purposes, it is assumed that the candidates of counterpart terminals 10 for the starting terminal 10*aa* are the terminals 10*ab*, 10*ba*, and 10*db*.

Next, the data processor 59 searches the terminal management table of FIG. 10 using the extracted terminal IDs ("01*ab*", "01*ba*", "01*db*") of the candidate counterpart terminals, as search keys, to obtain the operating states ("Offline", "Online (Communication OK)", and "Online (Communication OK)") of the terminals (10*ab*, 10*ba*, and 10*db*) (S27).

Next, the transmitter/receiver 51 transmits counterpart terminal state information including the terminal IDs ("01*ab*", "01*ba*", and "01*db*") serving as the search keys used at S27 described above and the operating states ("Offline", "Online (Communication OK)", and "Online (Communication OK)") of the counterpart terminals (terminals 10*ab*, 10*ba*, and 10*db*) corresponding to these terminal IDs to the starting terminal 10*aa* via the communication network 2 (S28). The starting terminal 10*aa* can obtain the current operating states ("Offline", "Online (Communication OK)", and "Online (Communication OK)") of the terminals (10*ab*, 10*ba*, and 10*db*) that are candidates of a counterpart terminal that can communicate with the starting terminal 10*aa*.

The data processor 59 of the management system 50 further searches the candidate list management table of FIG. 11 using the terminal ID "01*aa*" of the starting terminal 10*aa* which has sent the login request as a search key, to extract the terminal ID of another starting terminal that registers the terminal ID "01*aa*" of the starting terminal 10*aa* as a candidate counterpart terminal (S29). In the candidate list management table illustrated in FIG. 11, the terminal IDs of other starting terminals that are extracted are "01*ba*" and "01*db*".

Next, the data processor 59 of the management system 50 searches the terminal management table of FIG. 10 using the terminal ID "01*aa*" of the starting terminal 10*aa* which has sent the login request as a search key, and obtains the operating state of the starting terminal 10*aa* (S30).

The transmitter/receiver 51 transmits counterpart terminal state information including the terminal ID "01*aa*" and the operating state "Online (Communication OK)" of the starting terminal 10*aa*, obtained at S30, to terminals (10*ba* and 10*db*) whose operating states are "Online (Communication OK)" in the terminal management table (FIG. 10), among the terminals (10*ab*, 10*ba*, and 10*db*) having to the terminal IDs ("01*ab*", "01*ba*", and "01*db*") extracted at S29 (S31-1 and S31-2). When transmitting the counterpart terminal state information to the terminals (10*ba* and 10*db*), the transmitter/receiver 51 refers to the IP addresses of the terminals, which are managed in the terminal management table illustrated in FIG. 10, using the terminal IDs ("01*ba*" and "01*db*"). Accordingly, the terminal ID "01*aa*" and the operating state "online" of the starting terminal (terminal 10*aa*) which has sent the login request can be transmitted to other counterpart terminals (terminals 10*db* and 10*ba*) that can communicate with the starting terminal (terminal 10*aa*).

For any other terminal 10, as described above referring to S21, when the user turns on the power switch 109 illustrated in FIG. 3, the acceptor 12 illustrated in FIG. 6 accepts the power on operation and performs processing that is the same as or similar to the above-described S22 to S31-1 and S31-2, such that descriptions of which are omitted.

Figure 15:
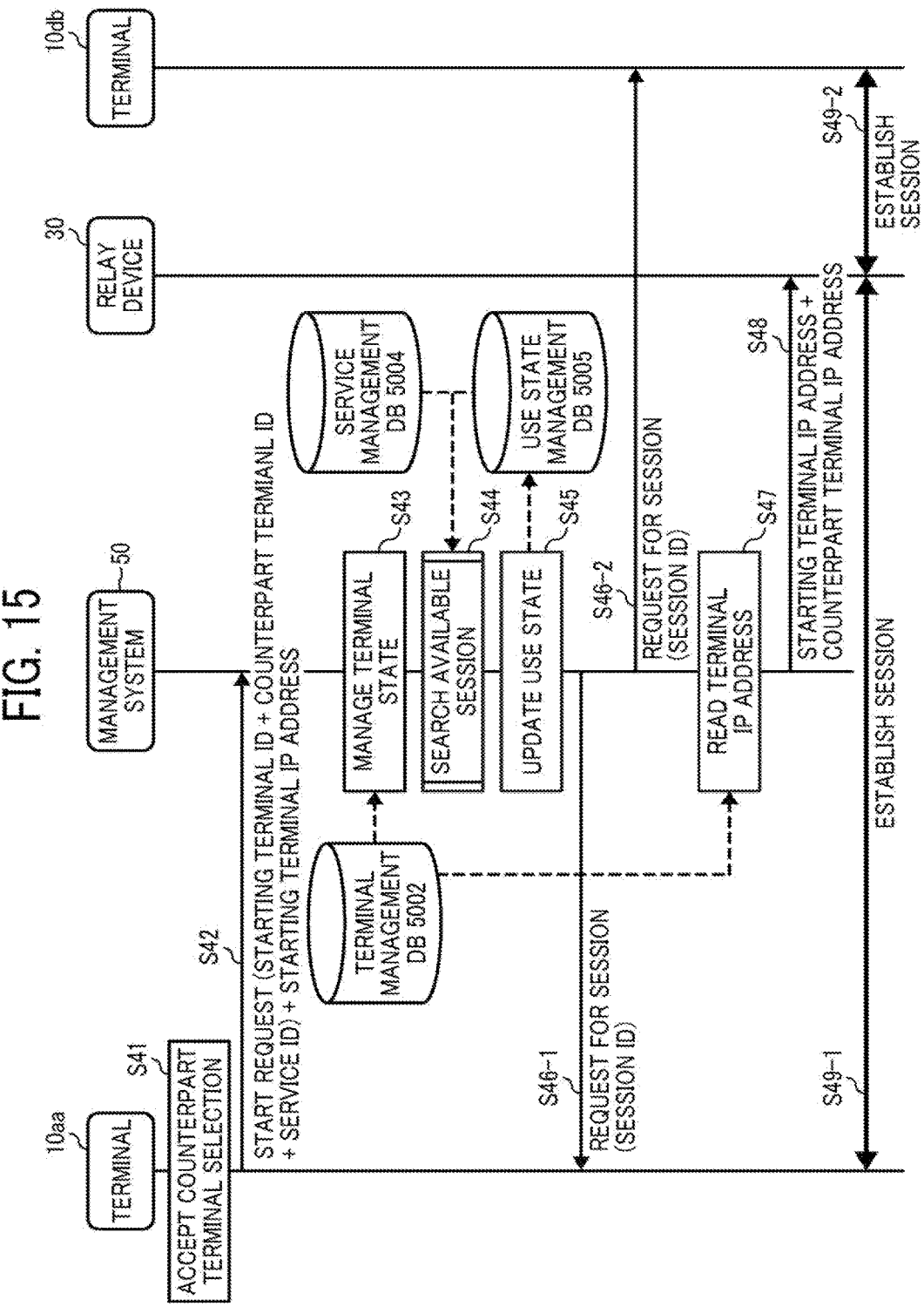
FIG. 15 is a data sequence diagram illustrating operation of establishing a communication session, performed by the communication system of FIG. 1, according to an embodiment of the present invention.
Figure 16:
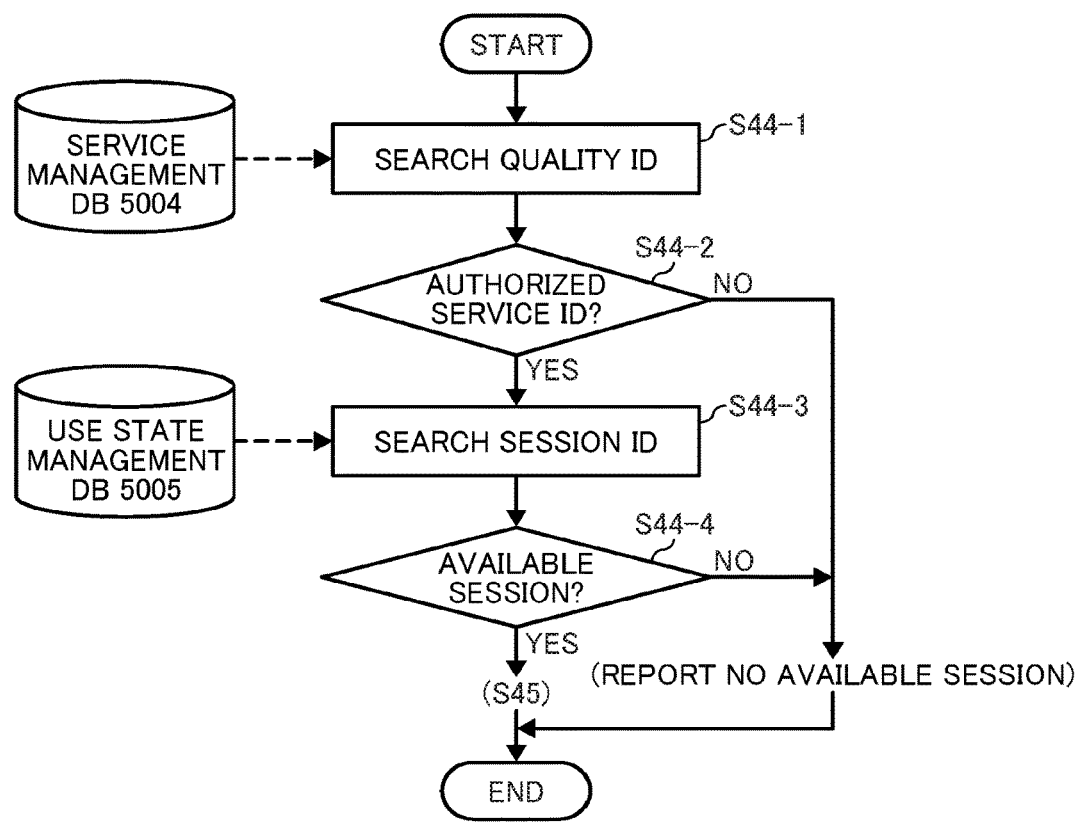
FIG. 16 is a flowchart illustrating operation of searching for a communication session that is available, performed by the management system of FIG. 1, according to an embodiment of the present invention.

Next, referring to FIGS. 15 and 16, operation of transmitting or receiving management data to prepare for starting communication between two remotely sites, namely, the terminal 10*aa* and the terminal 10*db*, will be described according to an embodiment of the present invention. FIG. 15 is a data sequence diagram illustrating operation of establishing a communication session. FIG. 16 is a flowchart illustrating operation of searching for a communication session that is available. In FIG. 15, various management data is transmitted or received through the management data session "sei" in FIG. 1.

First, when the user at the starting terminal 10*aa* presses the operation keys 108 illustrated in FIG. 2 and selects the terminal 10*db*, the acceptor 12 illustrated in FIG. 6 accepts a request for starting communication with the counterpart terminal (terminal 10*db*) (S41). The transmitter/receiver 11 of the starting terminal (terminal 10*aa*) transmits, to the management system 50, start request information indicating a request for starting communication with the counterpart terminal (terminal 10*db*) (S42). The start request information includes the terminal ID "01*aa*" of the starting terminal 10*aa*, the terminal ID "01*db*" of the counterpart terminal 10*db*, and the service ID of the starting terminal 10*aa*. The transmitter/receiver 51 of the management system 50 obtains the start request information, and further receives the IP address of the starting terminal 10*aa*, which is the transmission source. The service ID of the starting terminal 10*aa* is read out by the data processor 19 from the recording medium 1010, and transmitted by the data transmitter/receiver 11.

The manager 53, which obtains the terminal ID "01*aa*" of the starting terminal 10*aa* and the terminal ID "01*db*" of the counterpart terminal 10*db* from the start request information, changes the operating state field of each of records including the above-mentioned terminal IDs "01*aa*" and "01*db*" to "Online (Communicating)" in the terminal management table of FIG. 12 (S43). In this state, although the starting terminal 10*aa* and the counterpart terminal 10*db* have not started communicating, these terminals enter a communicating state, and, if another terminal 10 tries to communicate with the starting terminal 10*aa* or the counterpart terminal 10db, a notification sound or display that indicates that the terminal is communicating is output.

Next, the management system 50 searches for a communication session that is available (S44). Referring to FIG. 16, operation performed at S44 is explained in detail.

The data processor 59 of the management system 50 searches the service management table (FIG. 12) using the service ID received at S42 as a search key (S44-1). In this embodiment, it is assumed that the service ID "sv901" is received.

Through searching at S44-1, the determiner 52 determines whether the service management table (FIG. 12) stores a quality ID associated with the received service ID to determine whether the received service ID is a legitimate service ID (S44-2). When the determiner 52 determines that the received service ID is a legitimate service ID that is managed by the service management table (FIG. 12) ("YES" at S44-2), the data processor 59 searches the use state management table (FIG. 13) using the quality ID associated with the received service ID as a search key to obtain a plurality of session IDs for that quality ID (S44-3).

When the determiner 52 determines that the received service ID is not a legitimate service ID at S44-2 as there is no service ID that matches the received service ID in the service management table (FIG. 12) ("NO" at S44-2), the transmitter/receiver 51 of the management system 50 transmits a response that rejects the request received at S42 to the starting terminal 10aa.

When the received service ID is legitimate, the determiner 52, out of the plurality of session IDs obtained at S44-3, determines whether there is any session ID having the use state value "0" indicating that a communication session is available (S44-4). When there is a communication session ID having the use state value "0" indicating that a communication session is available ("YES" at S44-4), the operation proceeds to S45. When there is no communication session ID having the use state value "0", that is, all the communication session IDs associated with the quality ID have the use state values "1" ("NO" at S44-4), the transmitter/receiver 51 of the management system 50 transmits a response that rejects the request received at S42 to the starting terminal 10aa.

In the following, it is assumed that, at S44-4, there is a communication session ID having the use state value "0", and the operation proceeds to S45 of FIG. 15.

The manager 53 updates the use state management table (FIG. 13) by changing the use state value "0" of that communication session ID, to the use state value "1" indicating that the communication session is being used (S45).

The transmitter/receiver 51 transmits a request for establishing a session ("request for session") to the starting terminal 10aa (S46-1). The session establishing request includes the session ID of the communication session, which is associated with the use state value that has been updated at S45. The transmitter/receiver 11 of the starting terminal 10aa receives the session establishing request. The transmitter/receiver 51 of the management system 50 further transmits the session establishing request to the counterpart terminal 10db (S46-2). The session establishing request includes the session ID of the communication session, which is associated with the use state value that has been updated at S45. The transmitter/receiver 11 of the counterpart terminal 10db receives the session establishing request.

Next, the data processor 59 of the management system 50 searches the terminal management table (FIG. 10) using the terminal IDs of the starting terminal 10aa and the counterpart terminal 10db, received at S42, as search keys, to read corresponding IP addresses (S47).

The transmitter/receiver 51 of the management system 50 transmits the IP addresses of the starting terminal 10aa and the counterpart terminal 10db, which are read at S47, to the relay device 30 (S48). The relay device 30 receives the IP addresses of the starting terminal 10aa and the counterpart terminal 10db.

The transmitter/receiver 31 of the relay device 30 establishes a communication session with the starting terminal 10aa using the IP address of the starting terminal 10aa that is received at S46 (S49-1). The transmitter/receiver 31 of the relay device 30 establishes a communication session with the counterpart terminal 10db using the IP address of the starting terminal 10db that is received at S46 (S49-2).

Figure 17:
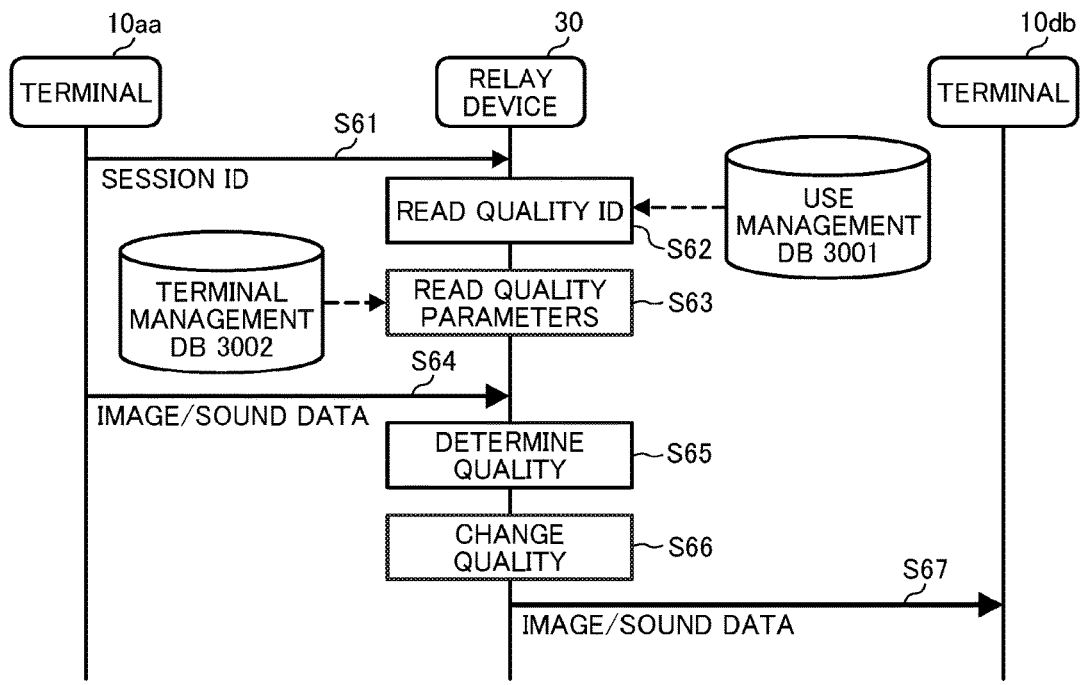
FIG. 17 is a data sequence diagram illustrating operation of communicating content data, performed by the communication system of FIG. 1, according to an embodiment of the present invention.

Referring now to FIG. 17, operation of communicating content data, performed by the communication system 1, is explained according to an embodiment of the present invention. FIG. 17 is a data sequence diagram illustrating operation of communicating content data.

Before sending image data and sound data for communication through the relay device 30, the transmitter/receiver 11 of the starting terminal 10aa transmits the session ID that is received at S46-1 to the relay device 30 (S61). The transmitter/receiver 31 of the relay device 30 receives the session ID.

The data processor 39 of the relay device 30 searches the use management table (FIG. 7) using the session ID received at S61 as a search key to obtain the quality ID associated with the received session ID (S62).

The data processor 39 searches the quality management table (FIG. 8) using the quality ID read at S62 as a search key to obtain the communication quality parameter associated with the quality ID (S63). More specifically, the image quality parameter and the sound quality parameter are extracted.

The transmitter/receiver 11 of the starting terminal 10aa transmits image data and sound data to the relay device 30 (S64). The transmitter/receiver 31 of the relay device 30 receives the image data and the sound data.

The determiner 32 of the relay device 30 determines whether the quality of the image data and the quality of the sound data, which are received at S64, match the quality defined by the image quality parameter obtained at S63 and the quality defined by the sound quality parameter obtained at S63, respectively (S65).

When the quality of the content data (image data and sound data) does not match the quality defined by the quality parameter, the changer 33 changes the quality of the content data (image data and sound data) according to the quality defined by the quality parameter obtained at S63 (S66). More specifically, when the quality of the image data transmitted from the starting terminal 10aa is a value that exceeds the image quality parameter, the changer 33 reduces the quality of the image data to the value of the image quality parameter. Similarly, when the quality of the sound data transmitted from the starting terminal 10aa is a value that exceeds the sound quality parameter, the changer 33 reduces the quality of the sound data to the value of the sound quality parameter. In this case, when the quality of the image data and the quality of the sound data transmitted from the starting terminal 10aa are values that are less than or equal to the image quality parameter and the sound quality parameter obtained at S63, respectively, the changer 33 does not change the quality of the image data and the quality of the sound data.

The data transmitter/receiver 31 of the relay device 30 transfers the image data and the sound data to the counterpart terminal 10db (S67) through the session established at S49-1. Accordingly, the starting terminal 10aa can transmit image data and sound data having qualities that are based on the service ID of the starting terminal 10aa that is transmitted with the communication start request.

In the case of transmitting image data and sound data from the counterpart terminal 10db to the starting terminal 10aa via the relay device 30, image data and sound data having qualities that are based on the service ID of the starting terminal 10aa can be transmitted.

Figure 18:
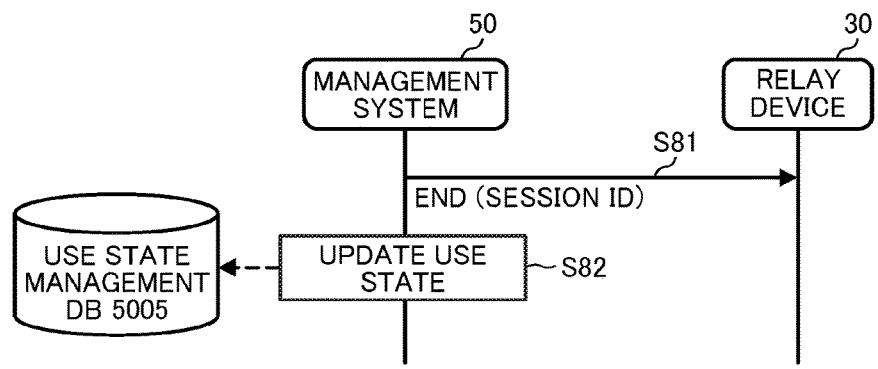
FIG. 18 is a data sequence diagram illustrating operation of updating the use state, performed by the management system of FIG. 1, according to an example embodiment of the present invention.

Referring to FIG. 18, operation of ending the communication session between the starting terminal 10aa and the counterpart terminal 10db is explained according to an embodiment of the present invention. FIG. 18 is a data sequence diagram illustrating operation of updating the use state in response to ending the communication session between the terminals 10.

As illustrated in FIG. 18, the transmitter/receiver 31 of the relay device 30 transmits a notification indicating end of communication to the management system 50 (S81). The notification includes the session ID received at S61. The transmitter/receiver 51 of the management system 50 receives the session ID.

The data processor 59 of the management system 50 refers to the use state management table (FIG. 13) to update the use state value, which is associated with the session ID received at S81, from the value "1" indicating that the communication session is being used, to the value "0" indicating that the communication session is not being used (S82). Accordingly, the communication session identified with the session ID transmitted at S81 is made available.

As described above, the use state of each of the communication sessions is managed with the use state management table (FIG. 13), such that communication sessions can be established by the terminals 10 as long as there is a communication session that is available. Accordingly, sessions are more effectively used, while still limiting a number of sessions that can be used at a time, thus contributing to stabilization of data traffic.

Further, the number of service IDs, that is, the number of users of the service, is made slightly greater than the number of communication sessions that can be used by the users provided with such service. This can effectively use a communication session that is available to the user.

Moreover, the number of sessions is controlled depending on the quality level of the service, that is, the usage fee that the user pays to the service provider. More specifically, for the service with higher quality, that is, the service with higher usage fee, greater number of sessions are made available. For the service with lower quality, that is, the service with lower usage fee, less number of sessions are made available. Accordingly, a waiting time for the user who is paying more usage fee tends to be less than a waiting time for the user who is paying less usage fee.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

For example, in alternative to storing association information that associates the quality ID with the session ID in a relay device, the relay device may only store the quality ID with the image quality parameter. In such case, however, the relay device is notified of the quality ID associated with the session ID, in addition to the session ID.

The relay devices 30 and the management system 50 in the above-described embodiment may be configured by a single computer or a plurality of computers to which divided portions (functions) are arbitrarily allocated.

In addition, a recording medium such as a CD-ROM storing the terminal control program, the relay device control program, or the communication management program in the above-described embodiment, is used as a program product in case of providing any one of the above programs to users within a certain country or outside that country.

In alternative to the display 120, any other desired display such as a projector or a terminal display may be used.

In addition, although the case of a videoconference terminal has been described as an example of a communication terminal in the above-described embodiment, the embodiment is not limited to this case, and the communication system 1 may be a phone system such as an IP phone system or an Internet phone system.

The communication terminal may be any one of a smart phone, a mobile phone, a car navigation terminal, and a wearable computer.

The communication terminal further may be any one of a monitoring camera, a digital camera, an electronic blackboard, a projector, medical equipment, office equipment, a game machine, a digital signage, agricultural equipment, or industrial equipment with a communication function.

A wearable computer includes a watch and a head-mounted display.

Industrial equipment includes office equipment such as a multifunction peripheral (MFP) printer product, medical equipment such as an endoscope, and agricultural equipment such as a cultivator.

In addition, although image data and sound data are described as examples of content data in the above-described embodiment, the content data is not limited to these items of data, and the content data may be touch data. In this case, a feeling obtained by a user's contact at one terminal side is transmitted to the other terminal side. Further, the content data may be smell data. In this case, a smell at one terminal side is transmitted to the other terminal side. In addition, the content data may be at least one of image data, sound data, touch data, and smell data.

In addition, although the case in which a videoconference is held by the transmission system 1 has been described in the above-described embodiment, the embodiment is not limited to this case. The transmission system 1 may be used in meetings, general conversation between family members or friends, or one-way presentation of information.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The invention claimed is:

1. A communication management system for managing a plurality of communication terminals, the system comprising:
   a memory that stores, for each service of a plurality of services that can be provided to one or more of the plurality of communication terminals, a quality identifier indicating a quality level of the service, in association with one or more session identifiers identifying one or more communication sessions for providing the service at the quality level of service, and use state information indicating whether each one of the corresponding communication sessions is being used;
   a receiver that receives, from a first communication terminal of the plurality of communication terminals, a request for starting communication with a second communication terminal, the request including a particular service identifier identifying a particular service to be provided to the first communication terminal in communicating with the second communication terminal, the particular service being one of the plurality of services that can be provided to one or more of the plurality of communication terminals, and the particular service identifier is stored in a subscriber identity module (SIM) card of the first communication terminal, and is read by the first communication terminal, and sent in the request received by the receiver,
   circuitry that obtains, by accessing the memory using the particular service identifier, a particular quality identifier, the particular quality identifier indicating a quality level of the particular service, determines, using the obtained particular quality identifier, session identifiers indicating communication sessions for providing the particular service and having the quality level of the particular service, and determines, using information stored in the memory, whether any one of the determined communication sessions for providing the particular service has the use state information indicating that the corresponding communication session is not being used; and
   a transmitter that transmits, to the first communication terminal, a particular session identifier of one of the communication sessions having the use state information indicating that the corresponding communication session is not being used, based on the determination,
   wherein the first communication terminal establishes a session identified with the particular session identifier transmitted from the communication management system, to transmit content data to the second communication terminal through the established session.

2. The communication management system of claim 1, wherein
   the memory further stores, for each service of the plurality of services, service identification information issued for each one of a plurality of users to be provided with the service, in association with the quality identifier indicating the quality level of the service, and
   the circuitry obtains the quality identifier associated with the particular service identifier, as the quality identifier indicating the quality level of the particular service.

3. The communication management system of claim 1, wherein
   the transmitter further transmits, to a relay device, the particular session identifier of the one of the communication sessions having the use state information indicating that the corresponding communication session is not being used, and
   the relay device establishes the communication session identified with the particular session identifier transmitted from the communication management system, to relay the content data transmitted from the first communication terminal to the second communication terminal.

4. The communication management system, of claim 1, wherein, when the circuitry further determines that all of the communication sessions for providing the particular service have the use state information indicating that the corresponding communication session is being used,
   the transmitter transmits a response that rejects the request for starting communication to the first communication terminal.

5. The communication management system of claim 1, wherein, after transmitting the session identifier, the circuitry further updates the use state information for the transmitted particular session identifier to indicate that the corresponding communication session is being used.

6. The communication management system of claim 2, wherein, in the memory, a number of items of the service identification information is greater than a number of items of the session identifier or each one of the plurality of services.

7. The communication management system of claim 6, wherein, in the memory, a difference between the number of items of the service identification information and the number of items of the session identifier is set differently among the plurality of services depending on the quality level of each service.

8. The communication management system of claim 7, wherein, in the memory, the difference between the number of items of the service identification information and the number of items of the session identifier is set lower as the corresponding quality level of the service increases.

9. A communication system, comprising:
   the communication management system of claim 1; and
   the first communication terminal configured to communicate with the communication management system through a network, wherein the first communication terminal reads the particular service identifier from a terminal memory, and transmits the read particular service identifier to the communication management system.

10. The communication system of claim 3, further comprising:
the relay device configured to communicate with the communication management system through a network, the relay device including:
a relay memory that stores information indicating an image quality parameter of content data in association with the quality identifier indicating the quality level; and
ray circuitry that determines whether the content data transmitted from the first communication terminal in communicating with the second communication terminal has an image quality parameter that is equal to or lower than an image quality parameter associated with the obtained quality identifier of the particular service, and changes the image quality parameter of the content data based on the determination.

11. A method of managing a plurality of communication terminals, comprising:
storing, in a memory, for each service of a plurality of services that can be provided to one or more of the plurality of communication terminals, a quality identifier indicating a quality level of the service, in association with one or more session identifiers identifying one or more communication sessions for providing the service at the quality level of service, and use state information indicating whether each one of the corresponding communication sessions is being used;
receiving, from a first communication terminal of the plurality of communication terminals, a request for starting communication with a second communication terminal, the request including a particular service identifying a particular service to be provided to the first communication terminal in communicating with the second communication terminal, the particular service being one of the plurality of services that can be provided to one or more of the plurality of communication terminals, and the particular service identifier is stored in a subscriber identity module (SIM) card of the first communication terminal, and is read by the first communication terminal, and sent in the request received in the receiving step;
obtaining, by accessing the memory using the particular service identifier, a particular quality identifier, the particular quality identifier indicating a quality level of the particular service;
determining, using the obtained particular quality identifier, session identifiers indicating communication sessions for providing the particular service and having the quality level of the particular service;
determining, using information stored in the memory, whether any one of the determined communication sessions for providing the particular service has the use state information indicating that the corresponding communication session is being used; and
transmitting, to the first communication terminal, a particular session identifier of one of the communication sessions having the use state information indicating that the corresponding communication session is not being used based on the determination,
the particular session identifier being used to establish a session for transmitting content data from the first communication terminal to the second communication terminal.

12. The method of claim 11, further comprising:
storing, in the memory, for each service of the plurality of services, service identification information issued for each one of a plurality of users to be provided with the service, in association with the quality identifier indicating the quality level of the service, and
obtaining the quality identifier associated with the particular service identifier, as the quality identifier indicating the quality level of the particular service.

13. The method of claim 11, further comprising:
when the determining determines that all of the communication sessions for providing the particular service have the use state information indicating that the corresponding communication session is being used,
transmitting a response that rejects the request for starting communication to the first communication terminal.

14. The method of claim 11, further comprising:
after transmitting the particular session identifier, updating the use state information for the transmitted particular session identifier to indicate that the corresponding communication session is being used.

15. A non-transitory recording medium storing a program which, when executed by one or more processors, cause the processors to perform a method comprising:
storing, in a memory, for each service of a plurality of services that can be provided to one or more of a plurality of communication terminals, a quality identifier indicating a quality level of the service, in association with one or more session identifiers identifying one or more communication sessions for providing the service at the quality level of service, and use state information indicating whether each one of the corresponding communication sessions is being used;
receiving, from a first communication terminal of the plurality of communication terminals, a request for starting communication with a second communication terminal, the request including a particular service identifier identifying a particular service to be provided to the first communication terminal in communicating with the second communication terminal, the particular service being one of the plurality of services that can be provided to one or more of the plurality of communication terminals, and the particular service identifier is stored in a subscriber identity module (SIM) card of the first communication terminal, and is read by the first communication terminal, and sent in the request received in the receiving step;
obtaining, by accessing the memory using the particular service identifier, a particular quality identifier, the particular quality identifier indicating a quality level of the particular service;
determining, using the obtained particular quality identifier, session identifiers indicating communication sessions for providing the articular service and having the quality level of the particular service;
determining, using information stored in the memory, whether any one of the determined communication sessions for providing the particular service has the use state information indicating that the corresponding communication session is not being used; and
transmitting, to the first communication terminal, a particular session identifier of one of the communication sessions having the use state information indicating that the corresponding communication session is not being used based on the determination, the particular session identifier being used to establish a session for transmitting content data from the first communication terminal to the second communication terminal.

* * * * *